(12) United States Patent
McCune et al.

(10) Patent No.: US 11,555,412 B2
(45) Date of Patent: Jan. 17, 2023

(54) LIGHTWEIGHT JOURNAL SUPPORT PIN

(71) Applicant: United Technologies Corporation, Farmington, CT (US)

(72) Inventors: Michael E. McCune, Colchester, CT (US); William G. Sheridan, Southington, CT (US); William P. Ogden, Hanover, PA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 193 days.

(21) Appl. No.: 16/705,479

(22) Filed: Dec. 6, 2019

(65) Prior Publication Data

US 2020/0116040 A1     Apr. 16, 2020

Related U.S. Application Data

(63) Continuation of application No. 15/109,910, filed as application No. PCT/US2015/010026 on Jan. 2, 2015, now Pat. No. 10,526,909.
(Continued)

(51) Int. Cl.
*F01D 15/12* (2006.01)
*F02C 7/36* (2006.01)
(Continued)

(52) U.S. Cl.
CPC ............... *F01D 15/12* (2013.01); *F02C 3/04* (2013.01); *F02C 7/06* (2013.01); *F02C 7/36* (2013.01); *F02C 9/18* (2013.01); *F02K 3/06* (2013.01); *F16H 57/0482* (2013.01); *F05D 2220/323* (2013.01); *F05D 2230/10* (2013.01); *F05D 2230/232* (2013.01); *F05D 2230/60* (2013.01); *F05D 2230/90* (2013.01);
(Continued)

(58) Field of Classification Search
CPC .................................. F01D 15/12; F02C 7/06
See application file for complete search history.

(56) References Cited

U.S. PATENT DOCUMENTS 2,591,743 A     4/1952  Thompson
2,704,234 A  *  3/1955  Love ........................ F16C 33/20
                                                                      384/280
(Continued)

FOREIGN PATENT DOCUMENTS

EP          1429005 A2    6/2004
EP          2267338 A1   12/2010
EP          2554874 A2    2/2013

OTHER PUBLICATIONS https://web.archive.org/web/20130507131723/https://www.jewelrynotes.com/the-mohs-scale-of-hardness-for-metals-why-it-is-important/ (Year: 2013).*

(Continued)

*Primary Examiner* — Michael L Sehn
(74) *Attorney, Agent, or Firm* — Carlson, Gaskey & Olds, P.C.

(57) ABSTRACT

A journal support pin to support intermediate gears for use in gas turbine engine comprises a titanium body, and an outer surface outside of the titanium body having a surface hardness that is harder than the body. A gas turbine engine and a method of forming a journal support pin to support intermediate gears for use in gas turbine engine are also disclosed.

11 Claims, 5 Drawing Sheets

Related U.S. Application Data

(60) Provisional application No. 61/929,145, filed on Jan. 20, 2014.

(51) Int. Cl.

| | | |
|---|---|---|
| *F16H 57/04* | (2010.01) | |
| *F02C 7/06* | (2006.01) | |
| *F02C 3/04* | (2006.01) | |
| *F02C 9/18* | (2006.01) | |
| *F02K 3/06* | (2006.01) | |
| *F16H 1/28* | (2006.01) | |

(52) U.S. Cl.
CPC .. *F05D 2260/31* (2013.01); *F05D 2260/4031* (2013.01); *F05D 2260/40311* (2013.01); *F05D 2260/98* (2013.01); *F05D 2300/141* (2013.01); *F05D 2300/171* (2013.01); *F05D 2300/2284* (2013.01); *F16H 1/28* (2013.01); *Y02T 50/60* (2013.01)

(56) References Cited

U.S. PATENT DOCUMENTS

| | | | |
|---|---|---|---|
| 3,650,353 A | 3/1972 | Abbott | |
| 3,853,432 A | 12/1974 | Cronstedt | |
| 4,271,928 A | 6/1981 | Northern | |
| 4,378,711 A | 4/1983 | Daniel | |
| 4,827,712 A | 5/1989 | Coplin | |
| 4,848,934 A * | 7/1989 | Blakely | F16C 33/121 |
| | | | 384/206 |
| 4,914,904 A | 4/1990 | Parnes et al. | |
| 5,137,374 A | 8/1992 | Orkin | |
| 5,391,125 A | 2/1995 | Turra et al. | |
| 5,433,674 A * | 7/1995 | Sheridan | F01D 5/02 |
| | | | 475/346 |
| 5,466,198 A | 11/1995 | McKibbin et al. | |
| 5,472,383 A | 12/1995 | McKibbin | |
| 6,158,210 A | 12/2000 | Orlando | |
| 6,223,616 B1 | 5/2001 | Sheridan | |
| 6,588,934 B2 * | 7/2003 | Law | B32B 15/015 |
| | | | 29/898.059 |
| 7,011,599 B2 | 3/2006 | Becquerelle et al. | |
| 7,021,042 B2 * | 4/2006 | Law | C23C 14/0623 |
| | | | 384/913 |
| 7,033,301 B2 | 4/2006 | Kimes | |
| 7,104,918 B2 | 9/2006 | Mitrovic | |
| 7,112,157 B2 | 9/2006 | Uebbing | |
| 7,165,890 B2 * | 1/2007 | Smith | F16C 33/124 |
| | | | 384/206 |
| 7,214,160 B2 | 5/2007 | Illerhaus | |
| 7,490,460 B2 | 2/2009 | Moniz et al. | |
| 8,007,178 B2 * | 8/2011 | Perrin | C23C 4/00 |
| | | | 384/276 |
| 8,276,275 B2 | 10/2012 | Sheridan et al. | |
| 2003/0201033 A1 | 10/2003 | Telakowski | |
| 2005/0220381 A1 | 10/2005 | Smith | |
| 2009/0111639 A1 | 4/2009 | Klingels | |
| 2010/0317478 A1 * | 12/2010 | McCune | F16H 57/0482 |
| | | | 475/159 |
| 2012/0237149 A1 * | 9/2012 | Uesugi | F16C 17/02 |
| | | | 384/397 |
| 2012/0237336 A1 | 9/2012 | McCune et al. | |
| 2013/0004297 A1 * | 1/2013 | Sheridan | F02K 3/04 |
| | | | 415/122.1 |
| 2013/0023378 A1 | 1/2013 | McCune et al. | |

OTHER PUBLICATIONS https://www.brycoat.com/surface-engineering/brycoat-pvd-coating-solutions/brycoat-titanium-nitride-tin-coatings/.* https://www.calicocoatings.com/coating-data-sheets/titanium-nitride-pvd-tin-coating/.*

The International Search Report and Written Opinion for PCT Application No. PCT/US2015/010026, dated Apr. 1, 2015.

International Preliminary Report on Patentability for International Application No. PCT/US2015/010026 dated Aug. 4, 2016.

Supplementary European Search Report for European Application No. 15737246.7 dated Nov. 30, 2016.

Notice of Opposition to Patent No. EP3097324. United Technologies Corporation opposed by Safran Aircraft Engines. Issued on Jan. 10, 2020.

Graphics extracted from: Dudley, D.W., Ed. (1991). Gear handbook, 2nd edition. New York, NY: McGraw-Hill. pp. 3.16-3.17.

Davis, J.R. (2005). Gear Materials, Properties, and Manufacture. ASM International, pp. 39-76.

Fanchon, Jean-Louis. (1996). Guide des Sciences et Technologies Industrielles. Afnor et Nathan.

Gras, Rene. (2011). Traitements et revetements de surface a usage tribologique. TRI 5 100. pp. 1-24.

ASM International. (2004). Introduction to Thermal Spray Processing. Handbook of Thermal Spray Technology (#06994G).

Leyens, C., Peters, M. (2003). Titanium and Titanium Alloys. Fundamentals and Applications. Wiley-VCH. pp. 187-230, 333-350, 483-497.

Sliney, Harold E. (1985). The Role of Silver in Self-Lubricating Coatings for Use at Extreme Temperatures. NASA Technical Memorandum 86943.

Letter from the Opponent for European Patent Application No. 3097324 (15737246.7) dated Jul. 13, 2020 by Safran Aircraft Engines.

Submission from Safran for European Patent No. 3097324 (15737246.7) dated Sep. 1, 2022. English translation plus foreign.

Interlocutory decision in Opposition proceedings for European Patent Application No. 3097324 (15737246.7) dated Dec. 14, 2021.

* cited by examiner

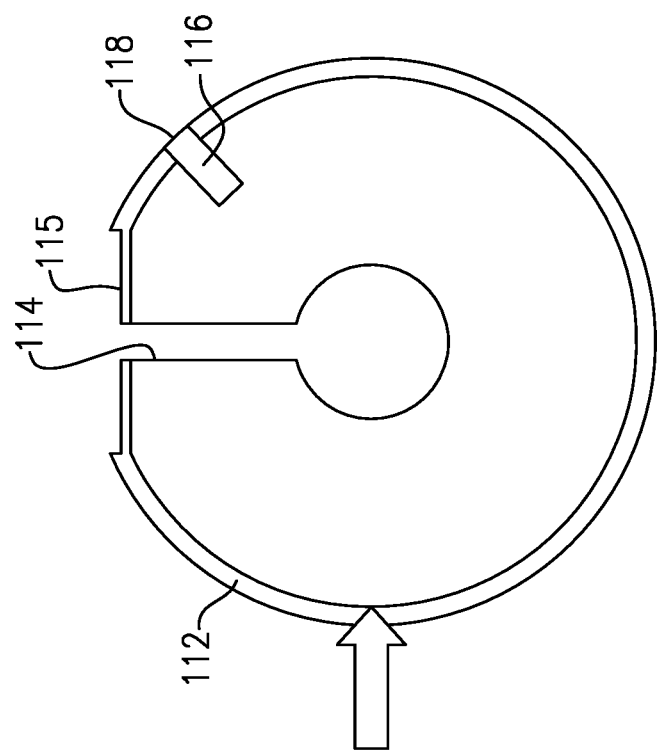
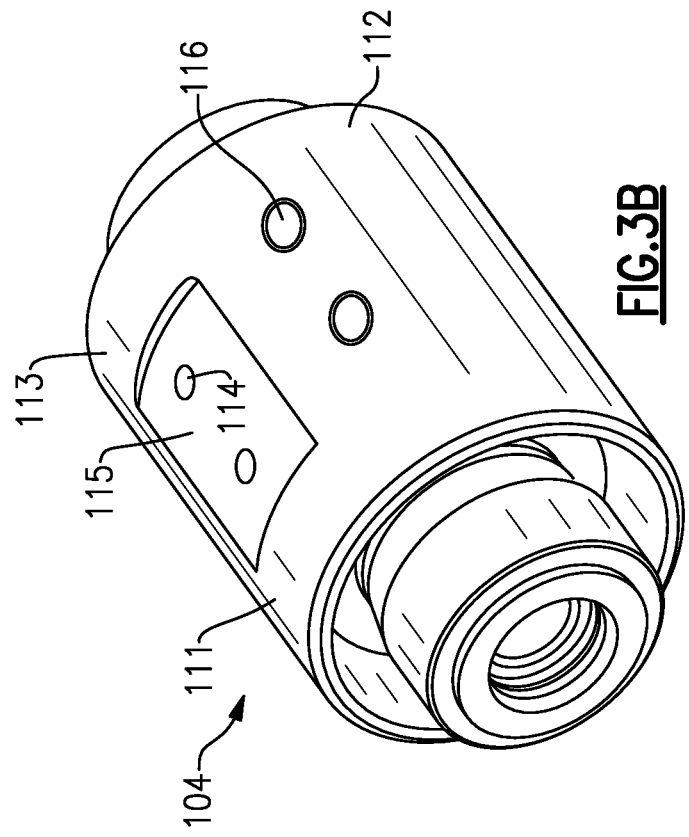

LIGHTWEIGHT JOURNAL SUPPORT PIN

CROSS-REFERENCE TO RELATED APPLICATION

This application is a continuation of U.S. patent application Ser. No. 15/109,910 filed Jul. 6, 2016, which is a National Phase of International Application No. PCT/US2015/010026 filed Jan. 2, 2015, which claims priority to U.S. Provisional Patent Application No. 61/929,145, filed Jan. 20, 2014.

BACKGROUND OF THE INVENTION

This application relates to a journal support pin for supporting a planet gear in an epicyclic gear set for a gear reduction system.

Gas turbine engines are known and, typically, include a fan delivering air into a bypass duct as propulsion air. The fan also delivers air into a compressor as core air. The core air is compressed and delivered into a combustion section where it is mixed with fuel and ignited. Products of this combustion pass downstream over turbine rotors driving them to rotate.

Historically, the fan rotated at a single speed with a fan drive turbine. This compromised both elements as the fan rotor could not rotate as slow as would be desired and the fan drive turbine rotor could not rotate as quickly as would be desired. Thus, it has been proposed to include a gear reduction between the two. Now, the fan rotor can rotate at a slower speed than the fan drive turbine.

With the inclusion of the gear reduction between the fan and the turbine rotor, however, it becomes desirable to limit the additional weight associated with the gear reduction.

SUMMARY OF THE INVENTION

In a featured embodiment, a journal support pin to support intermediate gears for use in gas turbine engine comprises a titanium body, and an outer surface outside of the titanium body having a surface hardness that is harder than the body.

In another embodiment according to the previous embodiment, oil supply holes extend from a central bore in the body through the surface.

In another embodiment according to any of the previous embodiments, the oil supply holes extend through the outer surface at a recess. A thickness of the outer surface is thinner than at axial ends of the titanium body.

In another embodiment according to any of the previous embodiments, the recess extends only over a limited circumferential portion of the outer surface.

In another embodiment according to any of the previous embodiments, the outer surface is provided by a steel sleeve.

In another embodiment according to any of the previous embodiments, the steel sleeve is pinned to the body to secure the sleeve to the body.

In another embodiment according to any of the previous embodiments, the outer surface is provided by a coating.

In another embodiment according to any of the previous embodiments, the coating is one of silver, steel and titanium nitride.

In another embodiment according to any of the previous embodiments, the outer surface is provided by nitriding.

In another embodiment according to any of the previous embodiments, the outer surface is provided by high velocity oxyfuel spray.

In another featured embodiment, a gas turbine engine comprises a fan and a fan drive turbine, which drives the fan through a gear reduction. The gear reduction includes a sun gear engaging intermediate gears and the intermediate gears engaging a ring gear. The intermediate gears are supported on journal support pins. The journal support pins have a titanium body. An outer surface outside of the titanium body has a surface hardness that is harder than the body.

In another embodiment according to the previous embodiment, oil supply holes extend from a central bore in the body through the surface.

In another embodiment according to any of the previous embodiments, the oil supply holes extend through the outer surface at a recess. A thickness of the outer surface is thinner than at axial ends of the titanium body.

In another embodiment according to any of the previous embodiments, the recess extends only over a limited circumferential portion of the outer surface.

In another embodiment according to any of the previous embodiments, the outer surface is provided by a steel sleeve.

In another embodiment according to any of the previous embodiments, the steel sleeve is pinned to the body to secure the sleeve to the body.

In another embodiment according to any of the previous embodiments, the outer surface is provided by a coating.

In another embodiment according to any of the previous embodiments, the coating is one of silver, steel and titanium nitride.

In another embodiment according to any of the previous embodiments, the outer surface is provided by nitriding.

In another embodiment according to any of the previous embodiments, the outer surface is provided by high velocity oxyfuel spray.

In another embodiment according to any of the previous embodiments, the gear reduction is a planetary epicyclic gear system and the intermediate gears are planet gears.

In another embodiment according to any of the previous embodiments, the gear reduction is a star epicyclic gear system and the intermediate gears are star gears.

In another embodiment according to any of the previous embodiments, a reduction ratio of the gear reduction is greater than about 2.3.

In another embodiment according to any of the previous embodiments, a core is surrounded by a core nacelle defined about the axis. A fan nacelle is mounted at least partially around the core nacelle to define a fan bypass airflow path for a fan bypass airflow. A bypass ratio defined by the fan bypass airflow divided by airflow through the core is greater than about eight (8).

In another featured embodiment, a method of forming a journal support pin to support intermediate gears for use in gas turbine engine comprises providing a titanium body, and enveloping an outer surface outside of the titanium body with a material having a surface hardness that is harder than the titanium body.

In another embodiment according to the previous embodiment, pin holes are drilled through the material and into the titanium body. Pins are inserted into the holes. The pins are welded to at least one of the material and the titanium body. Oil supply holes extend from a central bore in the body through the surface.

In another embodiment according to any of the previous embodiments, oil supply holes are drilled through the material and into the titanium body to a depth of a central passage in the titanium body.

In another embodiment according to any of the previous embodiments, the material is provided by a steel sleeve.

In another embodiment according to any of the previous embodiments, the material is provided by a coating.

In another embodiment according to any of the previous embodiments, the coating is one of silver, steel and titanium nitride.

These and other features may be best understood from the following drawings and specification.

BRIEF DESCRIPTION OF THE DRAWINGS

FIG. 3B is a perspective view.

FIG. 3C is a cross-sectional view.

DETAILED DESCRIPTION

Figure 1:
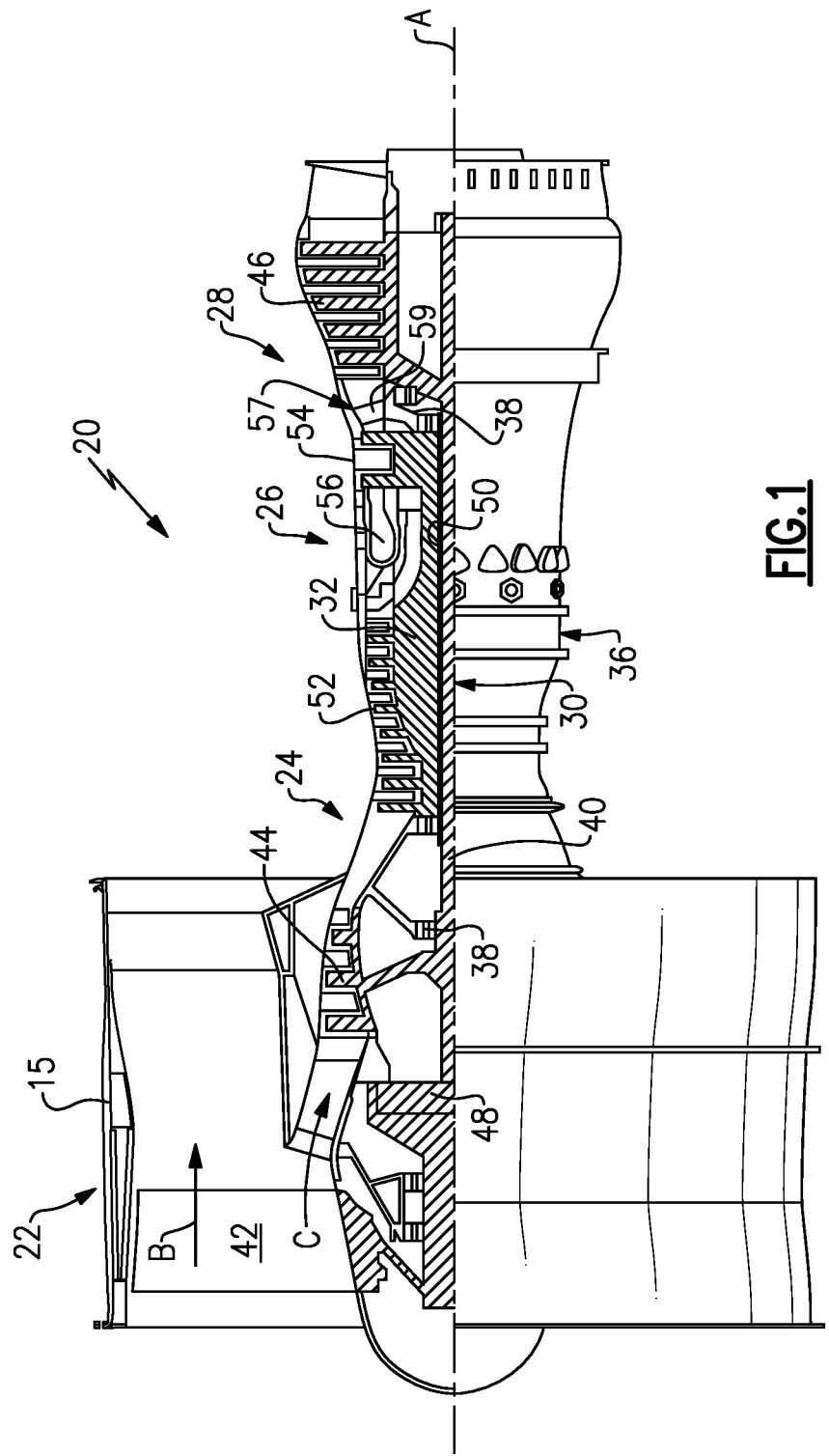
FIG. 1 shows a schematic of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about eight (8) or greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
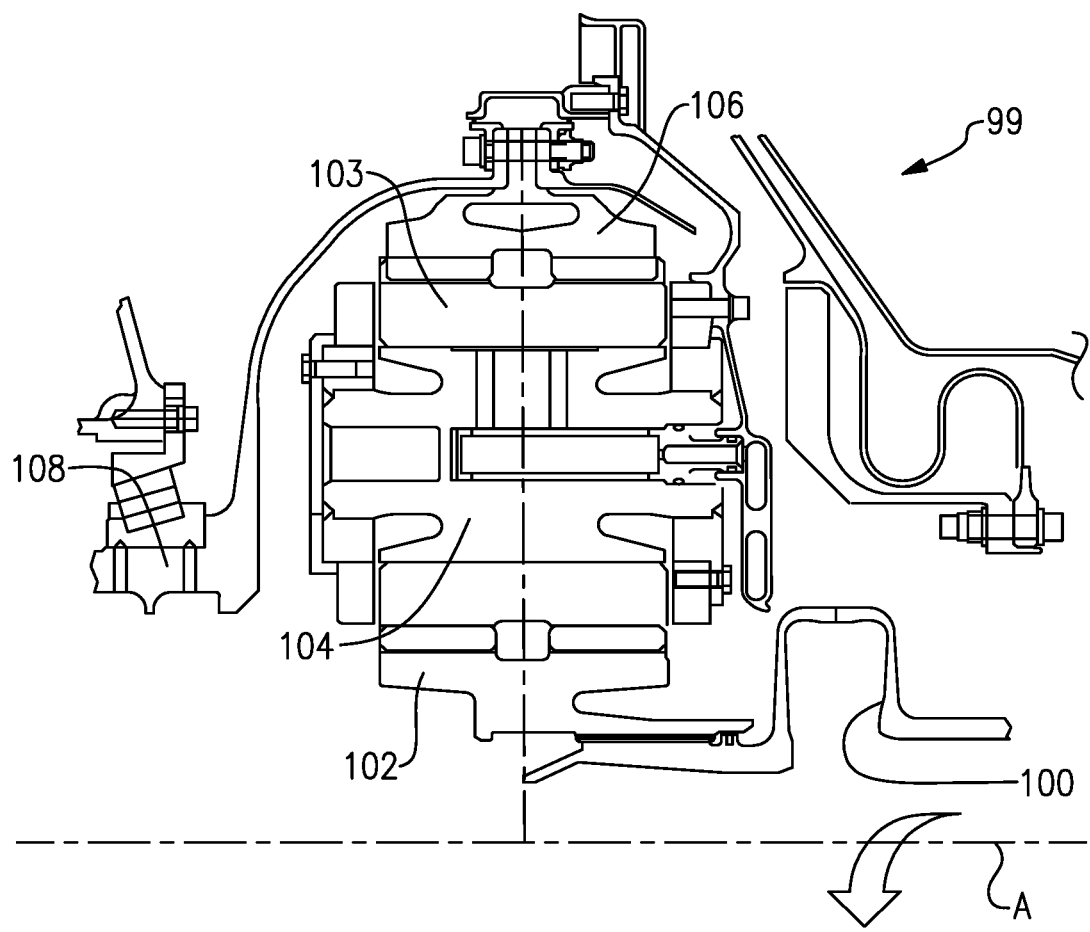
FIG. 2 is a detail of a gear reduction.

FIG. 2 shows a detail of a gear reduction 99 which may be incorporated into the engine 20 of FIG. 1. An input drive 100 includes a flexible connection which may be connected to a fan drive turbine such as turbine 46 of FIG. 1. The input connection 100 drives a sun gear 102. The sun gear 102 engages intermediate gears 103 which are mounted on journal support pins 104. In some embodiments, the intermediate gears 103 may be planet gears of a planetary epicyclic gear system. In other embodiments, the intermediate gears 103 may be star gears of a star epicyclic gear system. The intermediate gears 103 engage a ring gear 106. An output 108 of the ring gear 106, in some embodiments, drives a fan shaft for fan rotor 42. In other embodiments, a planetary gear carrier (not shown) driven by planetary gears may drive the fan shaft.

The gear reduction as shown in FIG. 2 is one in which the intermediate gears 103 are star gears and rotate on respective axes but are otherwise stationary relative to the sun gear 102. However, other types of epicyclic gear systems would benefit from the teachings of this application.

The journal support pins 104 add a good deal of weight to gear reduction system 99. As such, it would be desirable to reduce the overall weight.

The journal support pins 104 receive a high volume of stress and have typically been formed of hardened steel. However, steel is relatively heavy.

Figure 3A:
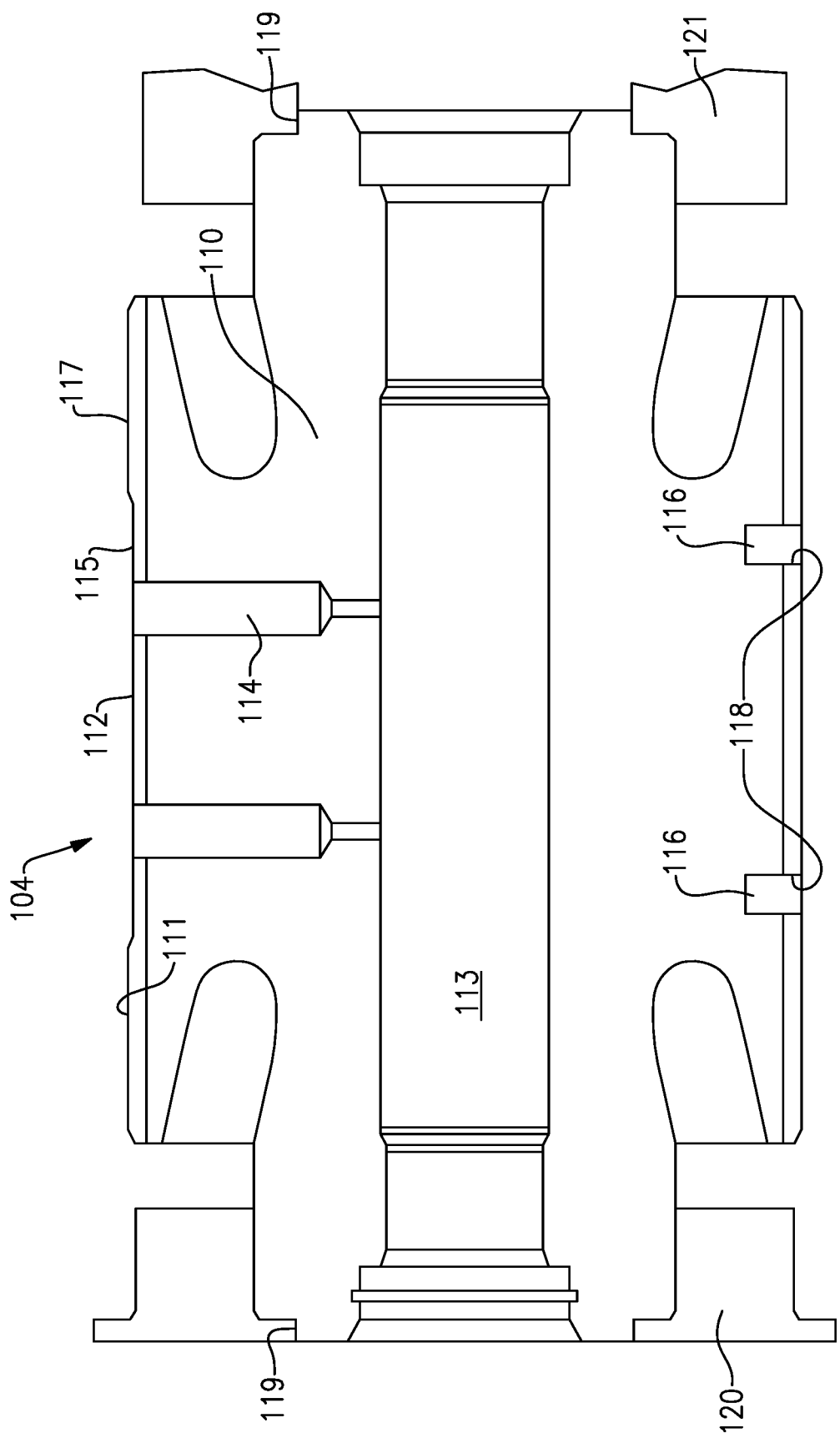
FIG. 3A is a cross-sectional view through a journal support pin.

In an embodiment shown in FIG. 3A, a journal support pin body 110 is formed of titanium. Alone, titanium may be insufficient due to rubbing contact with the intermediate gears 103, as titanium is not sufficiently hard and has poor adhesive wear properties. It is, however, lighter weight than steel.

Thus, a sleeve 112, which may be a hardened steel sleeve, is placed around an outer periphery of the body 110 of the journal support pin 104.

End caps 120 and 121 are attached to ends of the body of the journal support pin 110 and are welded at 119.

Oil holes 114 extend through the body 110 of the journal pin 104 and also through the sleeve 112. Central oil channel 113 receives oil which is then delivered through holes 114 to the outer periphery at a location 115. As shown at location 115, the thickness of the sleeve 112 is thinner than at axial ends 111 and 117 of the sleeve 112. Location 115 could be described as a recess 115.

Steel shear pins 116 extend through holes 118 in the sleeve 112 and secure the sleeve 112 to the body 110.

As shown in FIG. 3B, recess 115 provides an area to receive oil from the oil holes 114 and distribute that oil within the gears 103.

The shear pins 116 are preferably placed at a location which is relatively neutral of stress. The circumferential location for the pins is preferably a location that will not contact the planet gears.

As shown in FIG. 3C, the oil holes 114 extend through the sleeve 112 at the recess 115 and the pins 116 extend through the holes 118 in the sleeve 112.

In assembling the journal support pin 104, the sleeve is initially press fit onto the pin body 110. The shear pin holes 118 are drilled and pins 116 are press fit into the holes 118. The pins 116 are then welded to the sleeve 112. Thereafter, the oil holes 114 are drilled through the sleeve 112 and the body 110 to the central oil channel 113.

Then, the titanium end caps 120 and 121 are press fit and welded 119. The final grinding of the outer diameter may then occur.

Figure 4:
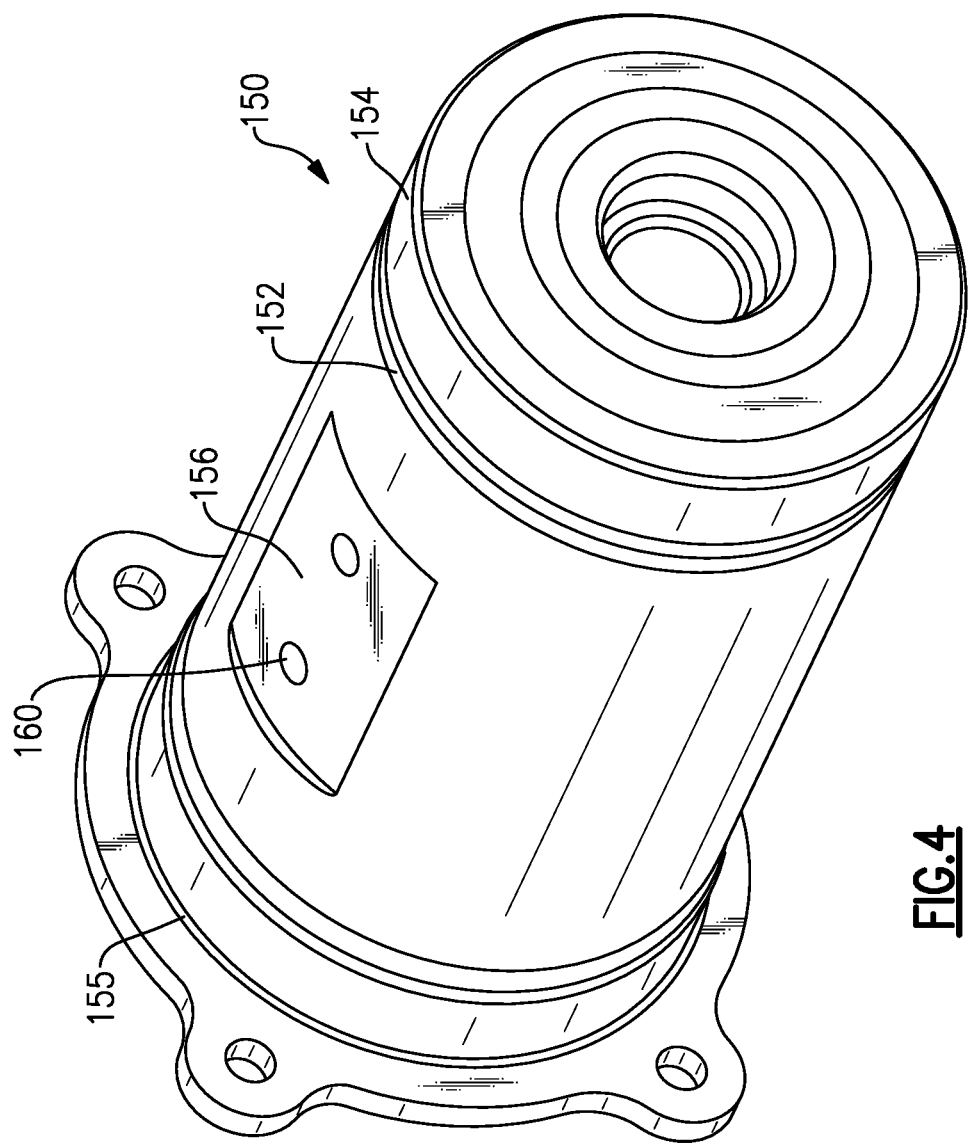
FIG. 4 shows an alternative embodiment.

FIG. 4 shows an alternative embodiment 150 wherein there is not a separate sleeve placed on the body 152. The end caps 154 and 155 are shown, as is the oil supply hole 160 and a recess 156 which provides a pocket to receive the oil, like the recess 115 in the FIG. 3B embodiment. In the embodiment 150, some outer treatment to the outer surface of the titanium body is performed.

In one example, a coating may be provided. The coating may be silver in one embodiment. The coating could alternatively be a titanium nitride. Alternatively, the outer surface may simply be nitride treated, by nitriding, carbonitride or carburized to increase surface strength. Alternatively, the coating could be a steel material which is cold sprayed onto the outer periphery, rather than being a separate sleeve. In addition, a high velocity oxyfuel layer may be applied.

In all embodiments, a journal support pin 104 supports planet gears 103 for use in gas turbine engine. The journal support pin 104 has a titanium body 110, and an outer surface outside of the titanium body having a surface hardness that is harder than the body. Oil supply holes 114 extend through the outer surface at a recess 115. A thickness of the outer surface at the recess is thinner than at axial ends 111, 117 of the titanium body. The recess 115 extends only over a limited circumferential portion of the outer surface.

All of the disclosed embodiments provide a journal support pin which will be able to survive in the environment that it will see in operation on a gas turbine engine, but still allow the use of relatively lightweight titanium.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A journal support pin to support intermediate gears for use in a gas turbine engine comprising:
   a titanium body, and an outer surface outside of said titanium body having a surface hardness that is harder than said body;
   said outer surface is provided by a coating; and
   oil supply holes extend from a central bore in said body through said coating.

2. The journal support pin as set forth in claim 1, wherein said oil supply holes extend through said coating at a recess, wherein a thickness of said coating is thinner at said recess than at axial ends of said titanium body.

3. The journal support pin as set forth in claim 2, wherein said recess extends only over a limited circumferential portion of said outer surface.

4. The journal support pin as set forth in claim 3, wherein said coating is one of silver, steel and titanium nitride.

5. The journal support pin as set forth in claim 1, wherein said coating is one of silver, steel and titanium nitride.

6. A gas turbine engine comprising:
   a fan and a fan drive turbine, said fan drive turbine driving said fan through a gear reduction;
   said gear reduction including a sun gear engaging intermediate gears and said intermediate gears engaging a ring gear, said intermediate gears being supported on journal support pins;
   said journal support pins having a titanium body and an outer surface outside of said titanium body having a surface hardness that is harder than said body, said outer surface provided by a coating; and
   oil supply holes extend from a central bore in said body through said coating.

7. The gas turbine engine as set forth in claim 6, wherein said oil supply holes extend through said coating at a recess, wherein a thickness of said coating is thinner at said recess than at axial ends of said titanium body.

8. The gas turbine engine as set forth in claim 7, wherein said recess extends only over a limited circumferential portion of said outer surface.

9. The gas turbine engine as set forth in claim 6, wherein said coating is one of silver, steel and titanium nitride.

10. The gas turbine engine as set forth in claim 6, wherein a reduction ratio of said gear reduction is greater than about 2.3.

11. The gas turbine engine as set forth in claim 6, wherein a flexible connection connects said fan drive turbine to said sun gear.

* * * * *